United States Patent
Chaney

(10) Patent No.: US 9,558,686 B2
(45) Date of Patent: Jan. 31, 2017

(54) COMBINATION MOUNTING AND STORING DEVICE FOR A VEHICLE SAFETY FLAG

(71) Applicant: Jeffery Jay Chaney, Terrell, TX (US)

(72) Inventor: Jeffery Jay Chaney, Terrell, TX (US)

(*) Notice: Subject to any disclaimer, the term of this patent is extended or adjusted under 35 U.S.C. 154(b) by 172 days.

(21) Appl. No.: 14/320,791

(22) Filed: Jul. 1, 2014

(65) Prior Publication Data
US 2015/0000587 A1 Jan. 1, 2015

Related U.S. Application Data

(60) Provisional application No. 61/841,736, filed on Jul. 1, 2013.

(51) Int. Cl.
*G09F 17/00* (2006.01)
*B60Q 7/02* (2006.01)

(52) U.S. Cl.
CPC .......... *G09F 17/00* (2013.01); *B60Q 7/02* (2013.01); *G09F 2017/0075* (2013.01)

(58) Field of Classification Search
CPC .......... G09F 17/00; G09F 2017/005; G09F 2017/0075; B60Q 7/00; B60Q 7/005; B60Q 7/02
USPC ......... 116/28 R, 30, 173, 174, 175; 242/350; 40/591, 592; 446/248; 473/176
See application file for complete search history.

(56) References Cited

U.S. PATENT DOCUMENTS

| | | | | |
|---|---|---|---|---|
| 1,588,577 A | * | 6/1926 | Heifler | B65D 85/672 225/26 |
| 2,166,520 A | | 7/1939 | Challoner | |
| 3,041,580 A | * | 6/1962 | Bos | B60Q 1/305 116/202 |
| 3,711,976 A | * | 1/1973 | Allen | A47G 1/14 40/514 |
| 4,429,839 A | * | 2/1984 | Jessamine | B63B 35/816 114/254 |
| 4,858,551 A | * | 8/1989 | Peters | B60Q 7/005 116/30 |
| 5,086,988 A | * | 2/1992 | LaPoint | B65H 75/406 242/395 |
| 5,699,904 A | * | 12/1997 | Ikemoto | A47G 25/78 206/278 |
| 5,915,547 A | * | 6/1999 | Chen | A47G 25/78 206/292 |
| 5,979,355 A | | 11/1999 | LeBlanc | |

(Continued)

FOREIGN PATENT DOCUMENTS

DE 9310101 U1 * 12/1993 ............. G09F 17/00

*Primary Examiner* — Richard A Smith
(74) *Attorney, Agent, or Firm* — Global Intellectual Property Agency, LLC; Jordan Sworen

(57) ABSTRACT

Disclosed is a combination mounting and storing device for a vehicle safety flag that is used to mark an oversized load. The device includes a hollow cylindrical housing having an interior volume and a bobbin disposed therein. The bobbin includes a reel that is adapted to retract and extend an elongated cord that is attached to the vehicle safety flag. The device further includes a magnet that allows a user to removably mount the device onto the inside of a truck bed or trunk. When the device is in use, the cord is extended outward so as to allow a user to secure the safety flag onto the extreme rear of the projecting load. The device can be mounted to the rear of the vehicle when transporting an oversized load and can be easily stored in a glove compartment when it is not in use.

9 Claims, 6 Drawing Sheets

(56) References Cited

U.S. PATENT DOCUMENTS

| | | | | |
|---|---|---|---|---|
| 6,129,035 A | * | 10/2000 | Schweinberger | B60Q 1/482 |
| | | | | 116/173 |
| 6,299,095 B1 | * | 10/2001 | Murfin | B65H 75/40 |
| | | | | 206/395 |
| 6,789,496 B2 | | 9/2004 | Gehris | |
| 6,921,040 B2 | * | 7/2005 | Watari | A45C 11/00 |
| | | | | 242/350 |
| 7,100,881 B2 | * | 9/2006 | Worrall | F16C 11/0619 |
| | | | | 116/173 |
| 8,302,552 B2 | | 11/2012 | Dover | |
| 8,882,605 B1 | * | 11/2014 | Lee | A63B 57/0087 |
| | | | | 15/209.1 |
| 2003/0196583 A1 | * | 10/2003 | Hensel | B60Q 1/484 |
| | | | | 116/28 R |

* cited by examiner

COMBINATION MOUNTING AND STORING DEVICE FOR A VEHICLE SAFETY FLAG

CROSS REFERENCE TO RELATED APPLICATION

This application claims the benefit of U.S. Provisional Application No. U.S. 61/841,736 filed on Jul. 1, 2013. The above identified patent application is herein incorporated by reference in its entirety to provide continuity of disclosure.

BACKGROUND OF THE INVENTION

Field of the Invention

The present invention relates to a combination mounting and storing device for a vehicle safety flag. More specifically, the present invention pertains to a retractable safety flag holder and mounting assembly that is adapted to removably attach to the inside of the truck bed or trunk of a vehicle carrying an oversized load. The flag holder and mounting assembly comprises a compact housing member with a hollow interior that is adapted to store the safety flag therein when it is not in use. In this way, the present invention may be easily stored or mounted as needed, providing flexibility to the user.

Oversized loads are special case shipments that exceed the operational parameters defined by each state. Under the Federal Motor Carrier Safety Administration, any commercial motor vehicle handling an oversized load or wide load is required to use wide load signs, safety flags, or wide load banners. More specifically, safety flags must be positioned at the extreme rear of the projecting load. Flags must be located to indicate maximum width of loads which extend beyond the sides and/or rear of the vehicle. In this way, the edges of any oversized load is marked to make them visible to drivers. Safety flags help protect the oversized load, and warns and protects other roadway users.

When using safety flags, the flags must be properly secured to the load so that it can travel against the wind and at high speeds on a moving vehicle. Traditional vehicle safety flags comprise a planar sheet of fabric that is affixed to a rigid support structure such as a pole or a frame that hold the flag thereon. The support structures are generally used in conjunction with a mounting bracket or other types of attachment means so that the flag may be secured onto the vehicle or the projecting load. The mounting brackets and other types of attachment means are inconvenient to install and remain permanently affixed to the vehicle.

Additionally, the flags must be stored after each use and kept accessible so that it may be used when transporting another oversized load at a later time. Many users, however, neglect to properly store the flags because it is inconvenient. Moreover, it is impracticable to use the same flag as used for a first vehicle on a second vehicle if the second vehicle does not have a flag mounting bracket or another type of attachment means that may be used with the flag.

The present invention is a combination mounting and storing device for a vehicle safety flag that is designed to removably mount to the inside of a trunk or a truck bed of a vehicle where needed, without requiring additional attachment means. The elongated cord of the present invention allows for a placement of a vehicle safety flag on the extreme rear of the projecting load with the housing mounted flush with the surface of the vehicle. The present combination mounting and storing device is installable onto various locations on the vehicle, including within the truck bed, fender, or trunk of the vehicle. Use of the present invention allows a user to easily secure a vehicle safety flag on any vehicle transporting an oversized load. Further, the present invention secures the flag in place inside the housing and retains it so that the device may be easily stored. The present invention is ideal for use with commercial vehicles as well as boats, trucks, motorcycles, bikes, and other vehicles.

The primary advantage of the present invention is not only its outward compact design and the installation methods associated with the mounting of the device, but more specifically the retractable feature associated with the bobbin disposed within the housing. The bobbin allows the cord to extend so that the flag may be secured to the extreme end of the load while the housing is mounted on the vehicle. Alternatively, the bobbin retracts the cord so that the cord can wrap around the reel of the bobbin and the flag may be stored within the housing. In this way, the cord is prevented from becoming tangled in between uses.

Description of the Prior Art

Devices have been disclosed in the prior art that relate to vehicle safety flag mounts. These include devices that have been patented and published in patent application publications. Some of these patents describe a flag that includes a tether with a loop at the end. The loop and tether can be attached to a large load that is being carried by a vehicle. Another patent describes a flag that is attached to a pulley for extending and retracting based on the size of the load being carried. These devices, however, do not include a casing that stores a retractable flag and a magnet adapted to mount the casing to a vehicle. The following is a list of devices deemed most relevant to the present disclosure, which are herein described for the purposes of highlighting and differentiating the unique aspects of the present invention, and further highlighting the drawbacks existing in the prior art.

For example, U.S. Pat. No. 6,789,496 to Gheris discloses a flagging device comprising a square shaped planar sheet of fabric-like material and an elongated cord. The cord has a first end and a second end, wherein the first end is attached to the planar sheet of fabric-like material and the second end comprises a loop. The loop is used to create a slipknot so as to secure the flagging device to a piece of equipment. Unlike the present invention, however, Gheris does not disclose a flag holder that is adapted to store the flag when it is not in use. Additionally, Gheris does not include a mounting assembly that is adapted to attach to the truck bed or trunk of a vehicle so that the flag may be securely attached to the vehicle that is transporting the oversized load. In contrast, the present invention provides a flag holder that includes a housing member adapted to store a safety flat therein. Additionally, the present invention includes attachment means such as a magnet to mount onto the vehicle. Accordingly, the present invention provides convenience to the user when storing and mounting the safety flag.

U.S. Pat. No. 2,166,520 to Challoner discloses a warning signal for trucks. The device comprises a square shaped flag that is attached to a retractable cord wounded around a spring held reel. The flag end of the device also comprises a hook that is adapted to secure the flag onto the rear of the truck. When in use, a user extends the cord until the hook can reach the fender of the truck. Thereafter, the cord is retracted until the hook wedges against the reel, thereby positioning the flag close to the reel. While Challoner discloses a warning signal having a retractable feature, the device of Challoner is limited in the fact that the spring held reel must be affixed to the rear of a vehicle, which is disposed under the oversized load that extend beyond the rear of the vehicle. Accordingly, the reel and the flag is not easily accessible to the user when the load is placed on the vehicle. In contrast, the combination mounting and storing device of the present invention is adapted to removably mount to the trunk or the truck bed of a vehicle. In this way, the device may be mounted where it is easily accessible to the user. Additionally, the present invention may be used on different vehicles if another vehicle is used to transport the oversized load.

Another device, U.S. Pat. No. 5,979,355 to LeBlanc discloses a tail flag assembly for use on a rear end of a utility pole of a pole trailer. The tail flag assembly comprises a ring mountable over the rear end of the pole and a plurality of screws extending radially through the ring for clamping the ring onto the rear end of the pole. The tail flag assembly further comprises a plurality of staffs affixed to the ring and extending outwardly tangentially from the ring, with each staff having a rectangular brightly colored flag affixed thereto. Each staff is made of a flexible material and is pliable for engagement under the crossbar handle of one of the screws. Thus, the staffs may be bent and engaged under a respective crossbar handle, so that the flag assembly may be stowed in a tool compartment of a utility truck. While LeBlanc discloses a mounting assembly for safety flags, the design of the device of LeBlanc may only be used with an oversized load that has a round cross section. More specifically, the diameter of the cross section of the load must be less than the diameter of the ring portion of the device so that the device may fit around the load. In contrast, the present invention provides a flexible cord that is adapted to secure a safety flag onto the oversized load of various shapes and sizes. In this way, the present invention may be used with a variety of oversized loads.

Finally, U.S. Pat. No. 8,302,552 to Dover discloses a caution flag for water sports safety. The device comprise a housing unit having a hollow cylinder shape that is adapted to receive a flag pole. The housing unit also includes an open first end and a closed second end, wherein the second end has a compression spring that is compressed when the flag pole is pushed down from the first end. The flag pole locks the compression spring in place, or in a retracted position via a trigger lever, which is also engaged to unlock the compression spring to extend the flag pole in a warning position. While Dover discloses a safety flag having a retractable feature, the purpose and design of the device of Dover differs from the present invention. The housing unit is not adapted to receive the flag therein. Additionally, the flag pole requires a flag pole bracket or a similar device adapted to hold the flag pole thereon. The present invention provides a combination mounting and storing device that stores the flag when it is not in use. Additionally, the present invention may be mounted on any part of a vehicle without the need to use a bracket or a similar device.

These prior art devices have several known drawbacks. The prior art fails to disclose a combination device adapted for storing and mounting a safety flag for marking oversized loads being transported on a vehicle. The present invention discloses a combination mounting and storing device that is convenient to use when storing or mounting the safety flag. More specifically, the present invention comprises a housing member having a hollow interior that is adapted to store the retracted cord and a safety flag attached thereto. Additionally, the bottom end of the housing member comprises attachment means such as a magnet that allows a user to removably attach the present invention to various locations on the vehicle. It is therefore submitted that the present invention substantially diverges in design elements from the prior art, which overcomes the disadvantages of the prior art devices, and consequently it is clear that there is a need in the art for an improvement to existing vehicle safety flag mounts. In this regard the instant invention substantially fulfills these needs.

SUMMARY OF THE INVENTION

In view of the foregoing disadvantages inherent in the known types of vehicle safety flag mounts now present in the prior art, the present invention provides a new improvement to a combination mounting and storing device for a vehicle safety flag wherein the same can be utilized for storing a retractable safety flag and mounting the flag to an oversized load on a vehicle.

It is therefore an object of the present invention to provide a new and improved combination mounting and storing device for a vehicle safety flag that has all of the advantages of the prior art and none of the disadvantages.

It is another object of the present invention to provide a new and improved combination mounting and storing device for a vehicle safety flag having a hollow interior that is adapted to store a safety flag therein.

Another object of the present invention is to provide a new and improved combination mounting and storing device for a vehicle safety flag having a bobbin that extends and retracts an elongated cord attached to a safety flag, wherein twisting and tangling of the cord is avoided.

Yet another object of the present invention is to provide a new and improved combination mounting and storing device for a vehicle safety flag having a highly visible safety flag to indicate maximum width of loads which extend beyond the sides and/or rear of the vehicle.

Still yet another object of the present invention is to provide a new and improved combination mounting and storing device for a vehicle safety flag that may be stored in a glove compartment of a vehicle when it is not in use.

Still yet another object of the present invention is to provide a new and improved combination mounting and storing device for a vehicle safety flag that mounts directly onto a vehicle surface via a magnet.

Still yet another object of the present invention is to provide a new and improved combination mounting and storing device for a vehicle safety flag that mounts directly onto a vehicle surface by means of fasteners.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and in manner in which it may be made and used may be better understood after a review of the following description, taken in connection with the accompanying drawings wherein like numeral annotations are provided throughout.

DETAILED DESCRIPTION OF THE INVENTION

Figures 1, 2:
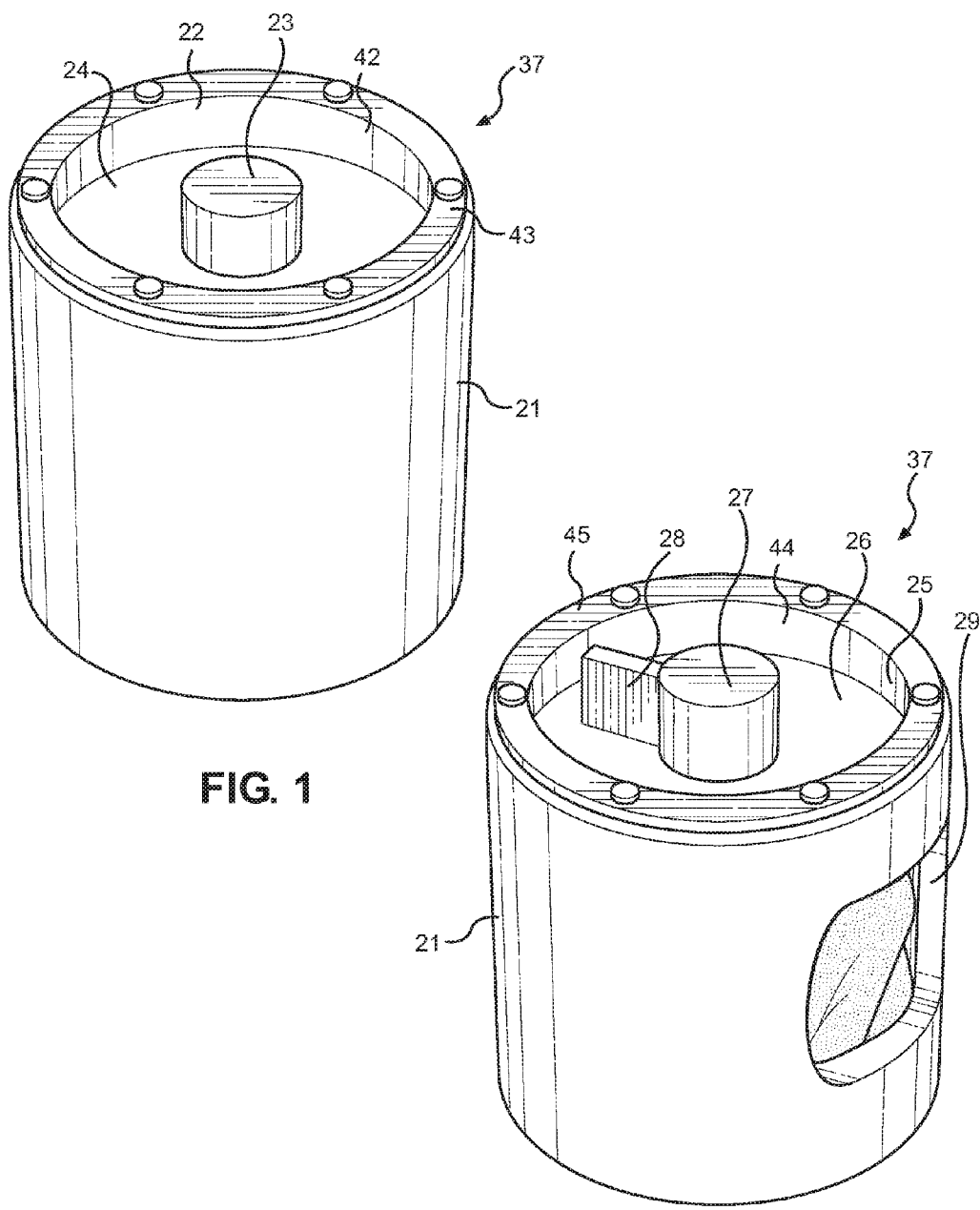
FIG. 1 shows a top perspective view of the present invention in a retracted position.
FIG. 2 shows a bottom perspective view of the present invention in a retracted position.

Reference is made herein to the attached drawings. Like reference numerals are used throughout the drawings to depict like or similar elements of the safety flag holder and mounting assembly. For the purposes of presenting a brief and clear description of the present invention, the preferred embodiment will be discussed as used for utilized for storing a retractable safety flag and mounting the flag to an oversized load on a vehicle. The figures are intended for representative purposes only and should not be considered to be limiting in any respect.

Referring now to FIGS. 1 and 2, there are shown perspective views of the present invention in a retracted position as viewed from the top and bottom, respectively. The present invention comprises a combination mounting and storing device 37 having a hollow cylindrical housing member 21 with a lateral surface, an open top and bottom end wherein each of the top and bottom end comprises a cap. The housing member 21 also comprises an opening 29 disposed along its lateral surface. The housing member 21 is composed of a rigid, durable material such as plastic, vinyl, metal, or other suitable material. The hollow interior of the housing member 21 is adapted to enclose a bobbin disposed therein, which spans the length thereof. The bobbin includes a top knob 23, a bottom knob 27, and a reel disposed therebetween. The bobbin may be composed of the same material as the housing member 21.

The top end of the combination mounting and storing device 37 comprises a top cap 22 having a flat upper surface 24 and an upstanding wall 42 that extends vertically therefrom. The top cap 22 is preferably press fitted onto the top end of the housing member 21. However, the top cap 22 may comprise other attachment means such as a threaded element, screws, bolts, or a hinge to secure onto the housing member 21. The top cap 22 also includes a flange 43 around the perimeter of the upstanding wall 42. The top cap 22 is adapted to enclose the top end of the housing member 21 such that the inner perimeter of the housing member 21 fits tightly around the outer perimeter of the cap 22, and the flange 43 rests directly on the top end of the housing member 21.

The top cap 22 further includes an aperture below the top knob 23 that is disposed in the middle portion of the surface 24. The aperture is dimensioned so as to prevent a top knob 23 from passing therethrough. The top knob 23 has a substantially circular cross section and is dimensioned so that it does not extend above the upstanding walls 42 of the top cap 22. In the illustrated embodiment, the top knob 23 comprises a smooth perimeter. The top knob 23 is physically independent from the top cap 22 and is not affixed to the surface 24. In this way, the top knob 23 may be turned or rotated in clockwise and counter clockwise directions. The top knob 23 is connected to a reel disposed in the hollow interior of the housing member 21 so that the top knob 23 may rotate simultaneously with the reel.

The bottom end of the combination mounting and storing device 37 comprises a bottom cap 25 having a flat upper surface 26 and an upstanding wall 44 that extends vertically therefrom. The bottom cap 25 is also preferably press fitted onto the bottom end of the housing member 21. In other embodiments, however, the bottom cap 25 may include a fasteners such as screws or bolts, or the cap 25 may include a threaded element so as to allow the cap 25 to screw onto the housing member 21. The bottom cap 25 also includes a flange 45 around the perimeter of the upstanding wall 44. The bottom cap 25 is adapted to secure onto the bottom end of the housing member 21 such that the inner perimeter of the housing member 21 fits tightly around the outer perimeter of the cap 25, and the flange 45 rests directly on the bottom end of the housing member 21.

The bottom cap 25 further includes an aperture disposed in the middle portion of the surface 26. The aperture is dimensioned so as to prevent a bottom knob 27 of a bobbin from passing therethrough. The bottom knob 27 has a substantially circular cross section and is dimensioned so that it does not extend above the upstanding walls 44 of the bottom cap 25. In the illustrated embodiment, the bottom knob 27 comprises a smooth perimeter. The bottom knob 27 also comprises a perimeter having a tab 28 attached thereto. The bottom knob 27 and the tab 28 are physically independent from the bottom cap 25. As such, the bottom knob 27 and the tab 28 are not affixed to the surface 26. In this way, the tab 28 may be used to turn or rotate the bottom knob 27 in clockwise and counter clockwise directions. The bottom knob 27 is further connected to a reel disposed in the hollow interior of the housing member 21 so that the bottom knob 27 and the tab 28 may rotate simultaneously with the reel. Additionally, the bottom knob 27 houses one or more magnets so as to allow the device to mount onto the truck bed surface or trunk of a vehicle, which is composed of metal. In some embodiments, the present invention may further comprise a metal plate that can be mounted to the truck bed surface or trunk of a vehicle so that the magnets can attach thereto. In this way, the bobbin is prevented from rotating when the device is in a mounted position, thereby keeping the reel in place during use.

Figure 3:
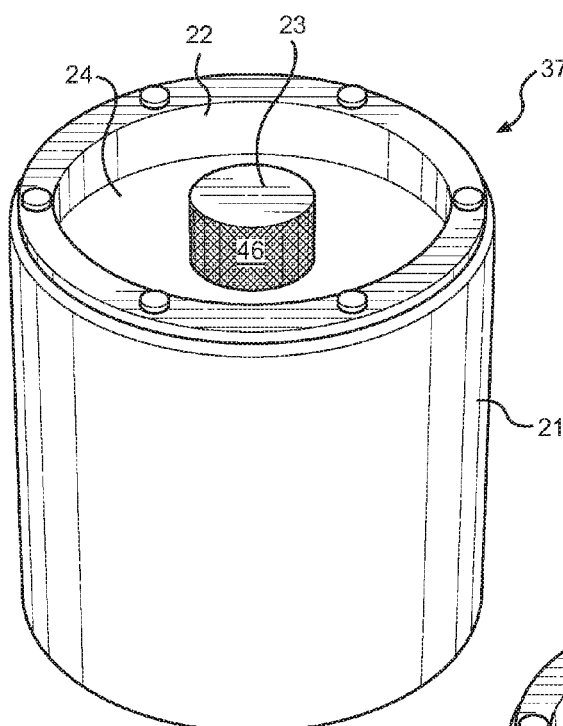
FIG. 3 shows a top perspective view of another embodiment of the present invention in a retracted position.
Figure 4:
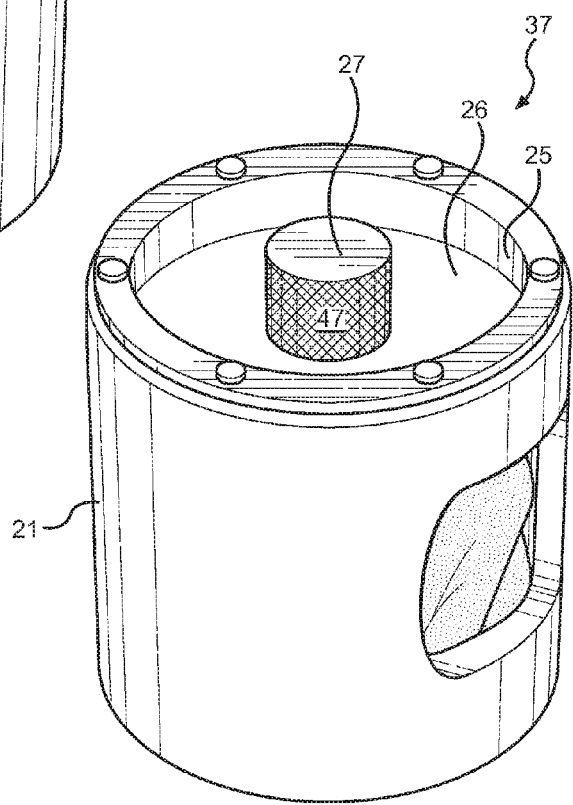
FIG. 4 shows a bottom perspective view of another embodiment of the present invention in a retracted position.

Referring now to FIGS. 3 and 4, there are shown another embodiment of the present invention. In the illustrated embodiment, the top knob 23 comprises a knurled surface 46 so as to allow a user to easily grab the knob 23. Similarly, the bottom knob 27 may comprise a knurled surface 47 so as to allow a user to easily grab the knob to turn or rotate it without the need to use a tab. The knurled surface 46, 47 includes a diamond-shaped or criss-cross pattern that is cut or rolled into the top knob 23 and/or the bottom knob 27. Alternatively, the knurled surface 46, 47 may comprise a series of straight edges or a helix of straight ridges.

Figure 5:
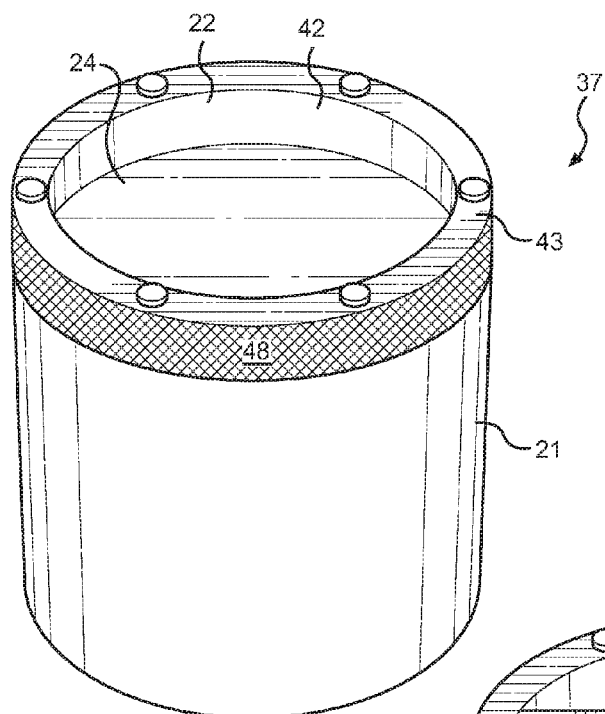
FIG. 5 shows a top perspective view of a third embodiment of the present invention.

Referring now to FIG. 5, there is shown a top perspective view of a third embodiment of the present invention 37. In the illustrated embodiment, the top cap 22 also includes a flange 43 around the perimeter of the upstanding wall 42 of the top cap 22. The flange 43 comprises a knurled lateral surface 48 that is substantially contiguous to the surface of the housing member 21. The top cap 22 knob 23 is not affixed to the housing 21 so that it is physically independent therefrom. In this way, the top cap 22 may be turned or rotated in clockwise and counter clockwise directions with respect to the housing. The top cap 22 is connected to a reel disposed in the hollow interior of the housing member 21 so that the top cap 22 may rotate simultaneously with the reel.

Figure 6:
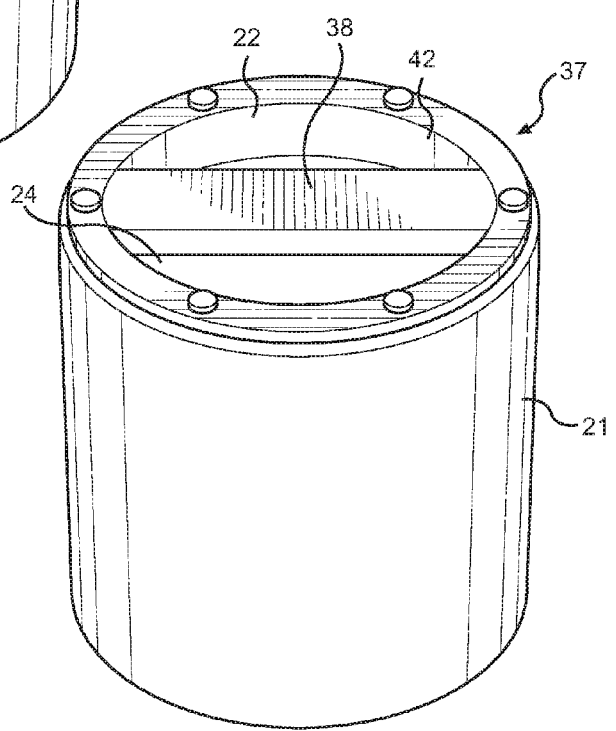
FIG. 6 shows a top perspective view of a fourth embodiment of the present invention.

Referring now to FIG. 6, there is shown a top perspective view of a fourth embodiment of the present invention 37. In the illustrated embodiment, the top cap 22 includes an elongated handle 38 that spans the diameter thereof such that the handle 38 does not extend beyond the upstanding wall 42. The handle 38 is orthogonal to the surface 24 and extends upward from the surface 24 to the top of the cap 22. In this way, the height of the handle 38 is substantially the same height as the upstanding wall 42 of the top cap 22. The handle 38 may be affixed to the top cap 22 so that it may be used as a gripping portion to rotate the cap 22. Alternatively, the handle 38 may be physically independent from the cap 22. As such, the handle 38 may be rotated in clockwise and counter clockwise directions with respect to the cap 22. The handle 38 is connected to a reel disposed in the hollow interior of the housing member 21 so that the handle 38 may rotate simultaneously with the reel.

Figure 7:
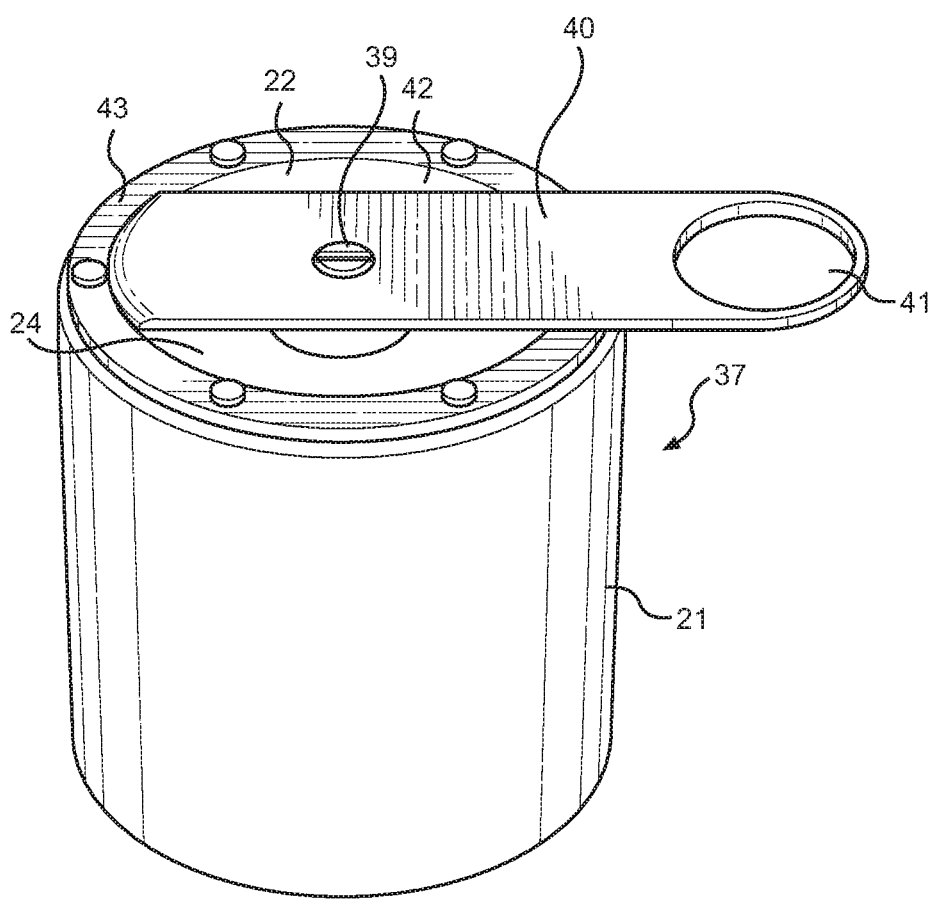
FIG. 7 shows a top perspective view of a fifth embodiment of the present invention.

Referring now to FIG. 7, there is shown a top perspective view of a fifth embodiment of the present invention 37. In the illustrated embodiment, the top cap 22 includes an elongated handle 40 that extends past the perimeter of the top cap 22. One end of the handle 40 is disposed along the upstanding wall 42 of the top cap 22. The second end of the handle 40 includes an aperture 41 that may be used for gripping. The top surface of the handle 40 may be substantially level with the flange 43 of the top cap 22. The handle 40 is attached to the top cap 22 via a fastener 39 such as a screw or a bolt. The handle 40 may be rotated in clockwise and counter clockwise directions with respect to the housing 21. The handle 40 is connected to a reel disposed in the hollow interior of the housing member 21 so that the handle 40 may rotate simultaneously with the reel.

Figure 8:
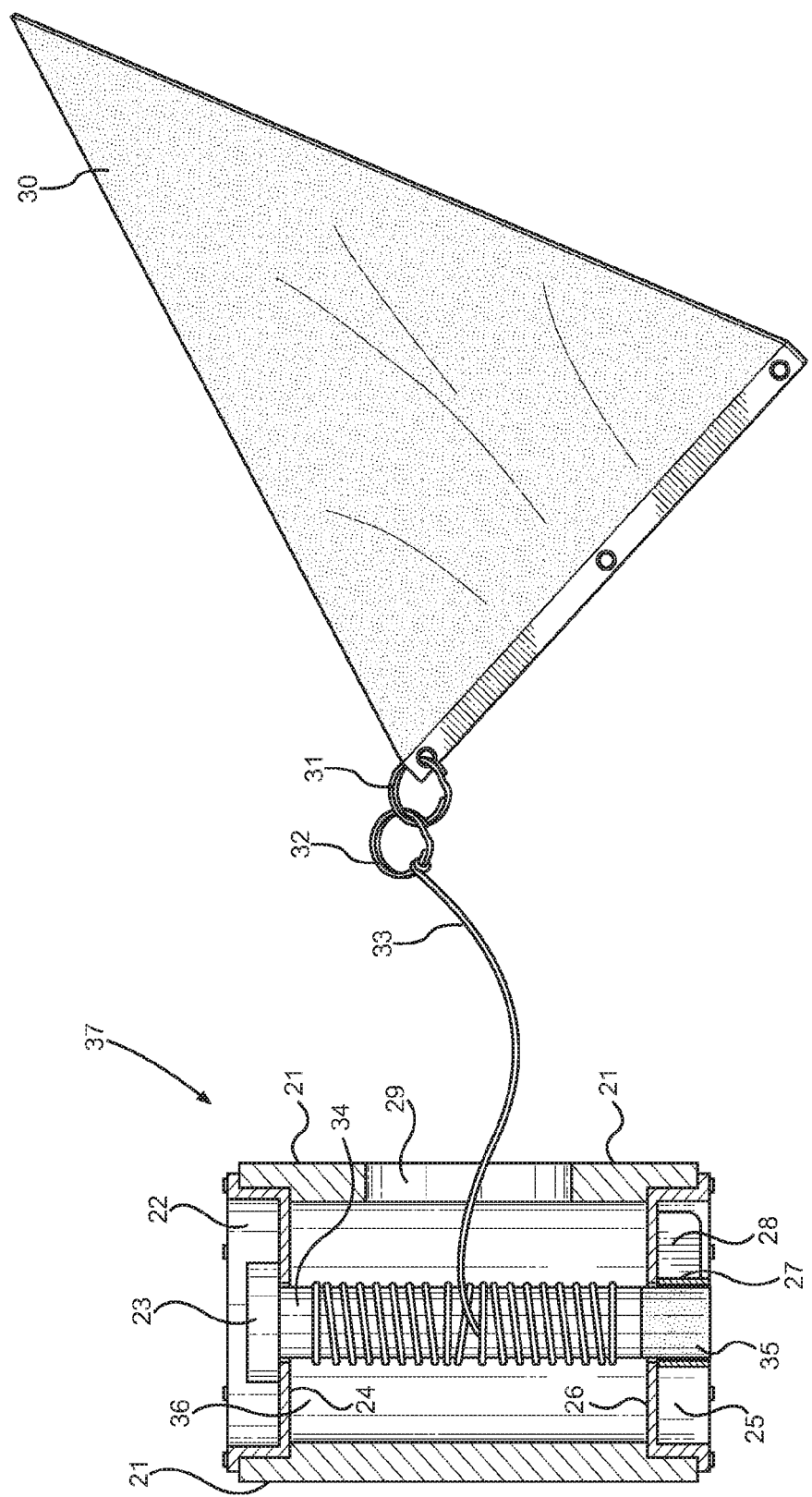
FIG. 8 shows a side cross sectional view of the present invention in an extended position.

Referring now to FIG. 8, there is shown a side cross-sectional view of the present invention in an extended position. The combination mounting and storing device 37 of the present invention comprises a housing member 21 enclosing a bobbin within its hollow interior 36. The bobbin comprises the top knob 23, the reel 34, and the bottom knob 27. The reel 34 is an elongated shaft with a circular cross section that spans the length of the hollow interior 36 of the housing member 21. The reel 34 includes a top end and a bottom end, wherein the top end is connected to the top knob 23 and the bottom end is connected to the bottom knob 27. The top knob 23 and the bottom knob 27 may be connected to the reel 34 via press fit, screws, strong adhesive, or the like.

The bottom knob 27 further includes a magnet 35 disposed therewithin. The magnet 35 may be dimensioned to fit inside the bottom knob 27. One or more magnets may be used, depending on the magnetic field strength of the magnet desired by the user. The magnet 35 allows a user to removably mount the device 37 directly onto the surface of a vehicle within the truck bed or the trunk, thereby allowing the device 37 to be removed or placed in a different location as desired by the user. It is preferred that the magnet is disposed within the interior of the bottom knob 27 to prevent the bobbin from spinning when the device is in use. In this way, the cord 33 does not inadvertently extend or retract while the device is in a mounted position. In some embodiments, the present invention may be used with a metal plate that can be installed onto the inside of a truck bed or a trunk so that the device 37 may be removably attached thereto. Additionally, the bottom cap 25 may comprise a strong adhesive, a hook and loop fastener, a clip, or similar fastening means disposed along the flange portion so as to mount the device 37 onto a vehicle.

The top knob 23 and the bottom knob 27 help prevent the reel 34 from sliding out of the apertures disposed on surfaces 24, 26, respectively. The reel 34 is adapted to rotate about its longitudinal axis when a user turns the reel 34 by grasping the tab 28, top knob 23, or the bottom knob 27, and rotating the same in either a clockwise or counter clockwise direction. It is further contemplated that a crank handle, a pivotally secured handle, or other means for rotating the reel may be used. In this way, the reel 34 is adapted to wind or unwind the cord 33 around the length of the reel 34, thereby allowing the user to retract or extend the cord 33. The cord 33 is threaded through the opening 29 disposed on the lateral surface of the housing member 21. The opening 29 is constructed to be wide enough so that the flag 30 can be inserted therethrough when the device 37 is not in use.

The cord 33 comprises two terminal ends, wherein the first terminal end is secured to the reel 34 and the second terminal end is secured to a safety flag 30. The cord 33 is composed of a durable film, wire, thread, or other flexible material having a high tensile strength. The cord 33 is elongated so that the flag 30 may be extended outwardly at a distance from the housing member 21 when in use. In this way, a user can mount the device 37 directly on the vehicle and extend the cord 33 so that the cord 33 can be secured onto the extreme end of an oversized load which extend beyond the sides and/or rear of the vehicle.

The second terminal end of the cord 33 is attached to the flag 30 via fastening means. In the illustrated embodiment, the fastening means comprises a loop 32 disposed at the second terminal end of the cord 33. The loop 32 is connected to a second loop 31, wherein the second loop 31 is attached to the safety flag 30. The loops 31, 32 attach the cord 33 and the flag 30 securely together so that the flag 30 can travel against the wind and at high speeds on the moving vehicle. Each of the loops 31, 32 may be a split ring, open jump ring, or a clasp so that it may be removably connected to each other without soldering. In this way, a user may replace the safety flag 30 as needed.

The flag 30 comprises durable fabric material such as a nylon mesh or polyester-cotton in a highly visible color, preferably red or orange. Furthermore, the flag may comprise fluorescent or reflective material that is visible in low light environments. The flag 30 may be constructed to be a planar sheet of fabric or a three dimensional design. In some embodiments, the flag 30 may be waterproof to withstand extreme weather. The flag 30 may be disconnected from the cord 33 so that it may be cleaned and reused.

Figure 9:
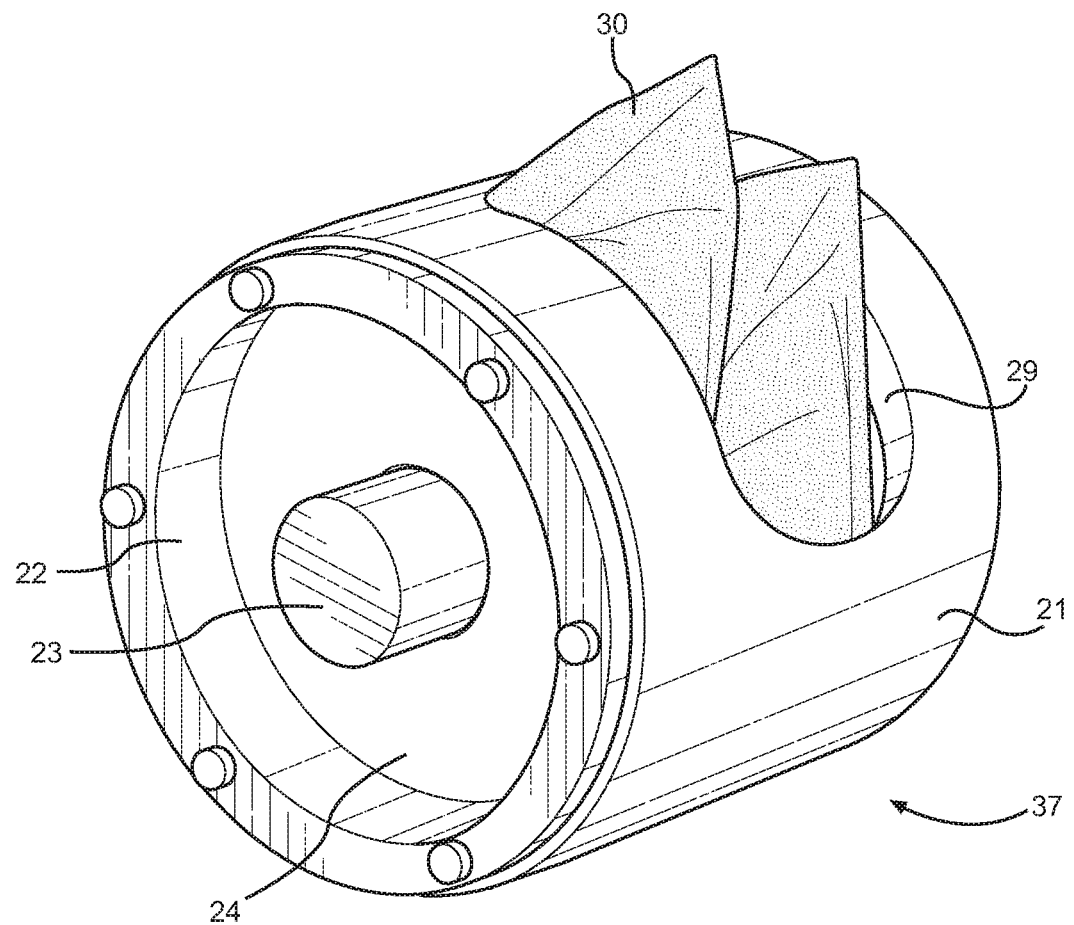
FIG. 9 shows a view of the present invention having a safety flag in a stored position.

Referring now to FIG. 9, there is shown a view of the safety flag 30 as it is stored in the housing member 21. In order to place the flag 30 within the interior of the housing 21, the cord 33 is retracted by turning the reel disposed within the interior of the housing member 21. A user may turn the reel by grasping the tab disposed on the bottom cap or by rotating the top knob 23. When the cord 33 is retracted, the user may fold the flag 30 and insert it through the opening 29 disposed on the lateral surface of the housing member 21. The flag 30 is adapted to fit snugly within the interior of the housing member 21 so that the flag 30 will not easily fall out while it is in a stored position. In this way, the device 37 may be stored in the glove compartment of a vehicle without inconveniencing the user. To use the device, the user may access the flag 30 through the opening 29 and pull it out therefrom.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A combination mounting and storing device for a vehicle safety flag, comprising:
    a cylindrical housing having a hollow interior, a lateral surface, an open top end, and an open bottom end;
    said housing lateral surface having an opening;
    a top cap attached to said top end;
    a bottom cap attached to said bottom end;
    wherein each of said top cap and said bottom cap comprise an upstanding wall extending vertically and a flange disposed around an upper perimeter of said upstanding wall;
    wherein each of said top cap and said bottom cap comprise a flat upper surface having a centralized aperture;
    said hollow interior having a rotatable bobbin with a reel;
    wherein said reel comprises a first end and a second end;
    said reel extending between said aperture of said top cap and said aperture of said bottom cap within said hollow interior of said housing;
    a top knob connected to said first end of said reel;
    said top knob disposed on said flat upper surface of said top cap;
    a bottom knob connected to said second end of said reel;
    said bottom knob disposed on said flat upper surface of said bottom cap;
    said reel, said top knob, and said bottom knob adapted to rotate about a vertical axis of said reel;
    an elongated cord having a first terminal end and a second terminal end;
    said first terminal end attached to said reel;
    said second terminal end attached to a flag;
    wherein said reel is adapted to retract and extend said elongated cord;
    a flag connected to said second terminal end of said elongated cord.

2. The combination mounting and storing device of claim 1, wherein said bottom knob comprises a tab attached thereto.

3. The combination mounting and storing device of claim 1, wherein each of said top knob and said bottom knob comprises a knurled surface.

4. The combination mounting and storing device of claim 1, wherein said flag comprises a vehicle safety flag.

5. The combination mounting and storing device of claim 1, wherein said bottom cap comprises one or more magnets.

6. The combination mounting and storing device of claim 1, wherein each of said top cap and said bottom cap comprise a knurled lateral surface.

7. The combination mounting and storing device of claim 1, wherein said top cap comprises an elongated handle disposed along a diameter of said top cap.

8. The combination mounting and storing device of claim 1, wherein said top cap comprises an elongated handle that extends past a perimeter of said top cap.

9. The combination mounting and storing device of claim 8, wherein said elongated handle comprises an aperture.

* * * * *